March 11, 1952 — H. A. WILLIS, JR — 2,588,598
TRUCK HOIST
Filed May 19, 1950
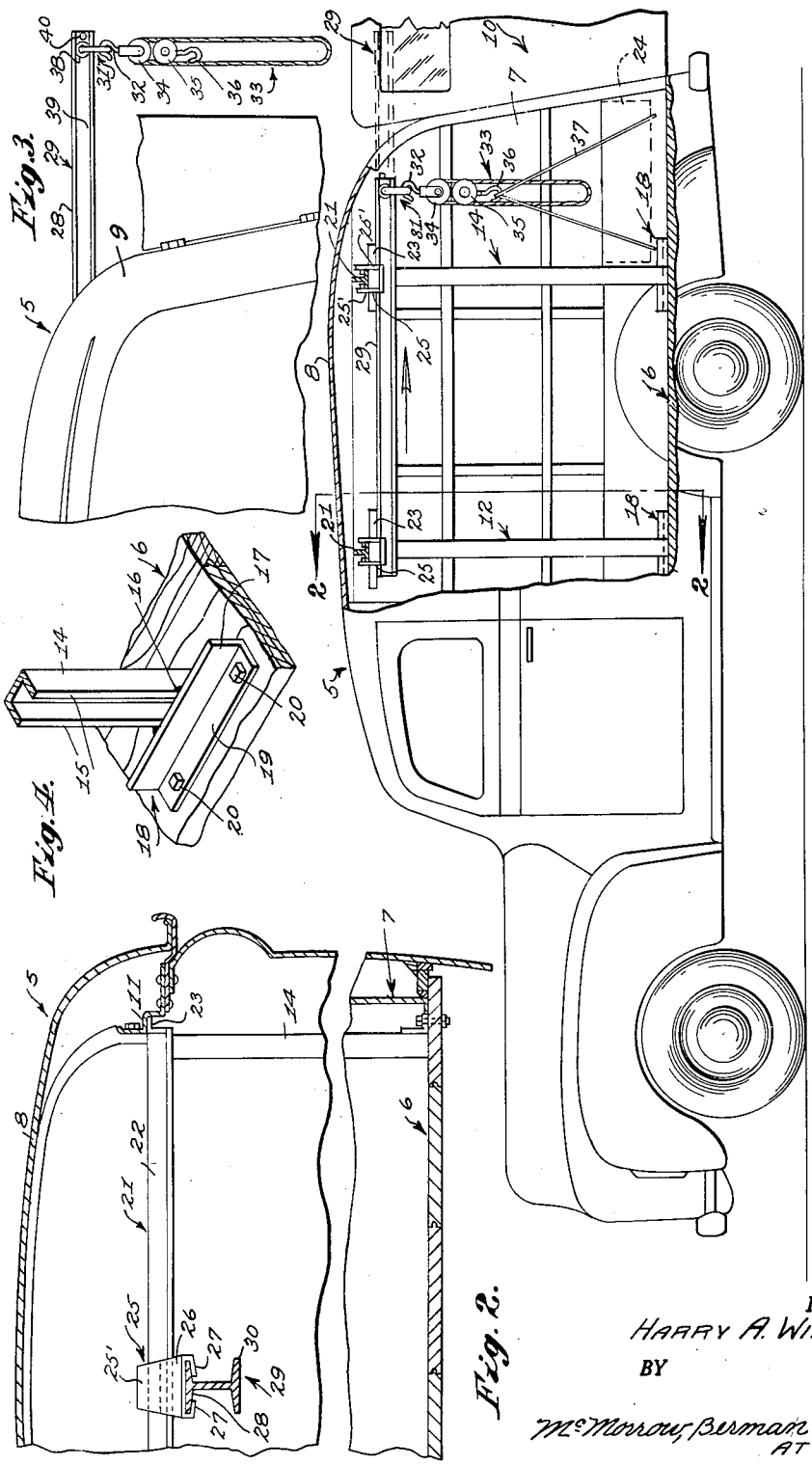
INVENTOR.
HARRY A. WILLIS, JR.
BY
McMorrow, Berman & Davidson
ATTORNEYS Patented Mar. 11, 1952

2,588,598

UNITED STATES PATENT OFFICE 2,588,598

TRUCK HOIST

Harry A. Willis, Jr., Loudonville, N. Y.

Application May 19, 1950, Serial No. 162,938

2 Claims. (Cl. 212—74)

1

This invention relates to a hoist, especially, although not exclusively, for installation in light trucks, such as panel trucks, sedan delivery trucks and the like, having rear loading doors, the primary object of the invention being to provide a simple and serviceable device of this kind which can be extended through the rear door for use in loading and unloading and moved forwardly into the body of the truck when not in use, to enable closing the rear door.

Another important object of the invention is to provide a simple device of the above-indicated character which can be readily installed in and removed from the truck and is readily transferable to another truck when desired without altering or damaging the truck body structures.

Other important objects and advantageous features of the invention will be apparent from the following description and the accompanying drawings, wherein, merely for purposes of illustration, a specific embodiment of the invention is set forth in detail.

In the drawings, wherein like numerals designate like parts throughout the several views:

Figure 1 is a general left-hand side elevation of a sedan-type light truck, with its rear door open, and broken away to show the hoist in retracted position in full lines, and in rearwardly extended position of use in dotted lines;

Figure 2 is an enlarged fragmentary transverse vertical section taken on the line 2—2 of Figure 1;

Figure 3 is a fragmentary view similar to Figure 1, showing the hoist extended from the rear of the truck for use;

Figure 4 is an enlarged fragmentary perspective view showing the attachment of one of the uprights to the truck floor.

Referring in detail to the drawings, the numeral 5 generally designates the enclosed body of a sedan type of light delivery truck, involving a floor 6, side panels 7, a roof panel 8, and a rear panel 9 provided with a loading and unloading opening closed by one or more doors 10 which are rearwardly swingable to open position. The side panels 7 have longitudinal horizontal ledges 11 which project laterally inwardly over the floor 6.

The hoist which is removably associated with the above-described truck body components comprises a frame composed of one or two pairs of laterally spaced uprights, including a forward pair 12 and a rearward pair 14. In some instances only the rearward pair of uprights 14 need be employed, as where it is desired to hoist the objects to be loaded only to the rear end of the floor 6, and it is not desired to convey the hoisted objects forwardly within the truck body 5.

The uprights of each pair are, as shown in Figure 4, preferably in the form of channel irons having laterally outwardly directed flanges 15, welded, as indicated at 16, to the laterally inward side of a vertical flange 17 on an angle iron foot 18 having a horizontal flange 19, to be bolted, as indicated at 20, to the truck body floor 6 closely adjacent to the adjacent side panel 7, as shown in Figure 2. Resting upon and welded to the upper ends of the uprights of each pair is a T-bar cross member 21, with its flange 22 directed upwardly, and having end flanges 23 on its opposite ends to engage under the ledges 11 on the truck side panel 7, as shown in Figure 2, to which the end flanges can be secured by suitable means (not shown) if desired, to steady the hoist structure.

As shown in Figure 1, the rear uprights 14 are spaced forwardly from the rear body panel 9, and hence from the rear end of the floor 6, at a distance such that the hoisted objects, such as a box 24, on being elevated to a level above the floor 6, can be deposited by the hoist onto the floor 6 near the door. The forward uprights 12 can be placed near the forward end of the truck body 5 to enable a hoisted object to be conveyed forwardly by the hoist to the front of the body before being deposited on the floor 6.

Welded or otherwise suitably secured to each of the cross members 21, preferably at the midpoints thereof, are the side plates 25' of C-shaped slide guides 25 consisting of the plates 26 from which the plates 25' rise at opposite sides of the cross members 21 to which they are secured. The plate 26 has inwardly directed flanges 27.

Confined slidably in the guides 25 is the upper flange 28 of an I-beam 29 having a similar lower flange 30, the I-beam constituting the boom or track of the hoist. The track 29 is proportioned in length to extend rearwardly the desired distance beyond the rear of the truck body when extended, and to occupy a position completely within the truck body 5, when retracted, so that the doors 10 can be closed.

Running on the lower flange 30 of the track 29 is a carriage 31 from which is suspended by a hook 32 a desired form of block and tackle 33, such as a chain-operated block and tackle, including upper and lower pulleys 34 and 35, respectively, with a hook 36 depending from the lower pulley for engagement with the load 24 or with a harness 37 or other suitable loadengaging means. The carriage 31 has rollers 38 rolling on the flange 30 at opposite sides of the web 39 of the track 29. A stop 40 is provided at the rear end of the track 29 for the carriage.

From the foregoing it is obvious that to load a package 24, the truck body rear doors 10 are opened, the track 29 pulled rearwardly through the door opening, and the hook 36 of the block and tackle connected to the load. The tackle is then operated to hoist the load to the desired level above the floor 6 and the carriage 31 is pulled or pushed forwardly to the desired place in the body and the tackle operated to deposit the load on the floor 6. When loading or unloading is completed, the track 29 is pushed forwardly in the guides 25 so that its rear end is within the truck body 5 and the doors 10 can be closed. The tackle 33 can be removed from the carriage for convenience while not in use.

I claim:

1. The combination with a vehicle body having a floor and vertical side panels rising along opposite sides of the floor, of a hoist comprising uprights at each side of said body and spaced along the inner sides of the panels, means securing the lower ends of the uprights to the floor, cross members extending between and supportably secured to the upper ends of the uprights, said cross members being secured at their ends to said side panels, a horizontal slide guide secured to each of said cross members at points between said uprights, a track having a portion thereof supportably and slidably engaged with said slide guides whereby said track can be moved longitudinally relative to the vehicle body, and a block and tackle mounted on said track.

2. The combination with a vehicle body having a floor and vertical side panels rising above and extending longitudinally along both sides of said floor, of a hoist comprising at least one upright at each side of said body at the inner sides of the body panels, bracket means fixing the lower end of the upright to the floor, a cross member extending across the body and supportably fixed on the upper ends of the uprights, said cross member having elements on its opposite edges rigidly connected to the side panels whereby the side panels form structural parts of the hoist, a slide guide mounted on said cross member and extending longitudinally of the vehicle body, a longitudinal track slidably mounted on said slide guide and movable longitudinally relative to the slide guide and the vehicle body, and a block and tackle secured to and depending from an end of said track.

HARRY A. WILLIS, JR.

REFERENCES CITED

The following references are of record in the file of this patent:

UNITED STATES PATENTS

| Number | Name | Date |
|---|---|---|
| 1,764,935 | Davey et al. | June 17, 1930 |
| 2,263,105 | Schon | Nov. 18, 1941 |
| 2,428,144 | Clough | Sept. 30, 1947 |
| 2,437,486 | Staiger | Mar. 9, 1948 |